US010057503B2

(12) United States Patent
Suzuki

(10) Patent No.: US 10,057,503 B2
(45) Date of Patent: Aug. 21, 2018

(54) IMAGE PROCESSING APPARATUS AND METHOD FOR APPLYING A VIRTUAL LIGHT SOURCE TO AN IMAGE

(71) Applicant: CANON KABUSHIKI KAISHA, Tokyo (JP)

(72) Inventor: Hiroshi Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 15/400,172

(22) Filed: Jan. 6, 2017

(65) Prior Publication Data

US 2017/0195581 A1 Jul. 6, 2017

(30) Foreign Application Priority Data

Jan. 6, 2016 (JP) .................................. 2016-001293

(51) Int. Cl.
*H04N 5/228* (2006.01)
*H04N 5/262* (2006.01)
*H04N 5/235* (2006.01)
*H04N 5/243* (2006.01)

(52) U.S. Cl.
CPC ......... *H04N 5/2621* (2013.01); *H04N 5/2351* (2013.01); *H04N 5/243* (2013.01)

(58) Field of Classification Search
CPC ..................................................... H04N 5/2621
USPC ........................................................ 348/222.1
See application file for complete search history.

(56) References Cited

U.S. PATENT DOCUMENTS

| | | | |
|---|---|---|---|
| 2015/0077591 A1* | 3/2015 | Fujiwara | H04N 5/23216 348/234 |
| 2015/0178550 A1* | 6/2015 | Hirashima | G06T 11/60 382/118 |
| 2017/0186222 A1* | 6/2017 | Hata | G06T 15/506 |

FOREIGN PATENT DOCUMENTS

| | | |
|---|---|---|
| JP | 2007-148537 A | 6/2007 |
| JP | 2010-135996 A | 6/2010 |

* cited by examiner

*Primary Examiner* — Usman Khan
(74) *Attorney, Agent, or Firm* — Carter, Deluca, Farrell & Schmidt, LLP

(57) ABSTRACT

An image processing apparatus comprises: an obtainment unit configured to obtain an image; a setting unit configured to set, based on a shading status of a region of a first subject out of a plurality of subjects included in the image, a virtual light source for virtually emitting light on a region of a second subject in the image that is different to the first subject; and a generation unit configured to generate an image having a shading status such that light based on the set virtual light source is emitted onto the region of the second subject.

11 Claims, 6 Drawing Sheets

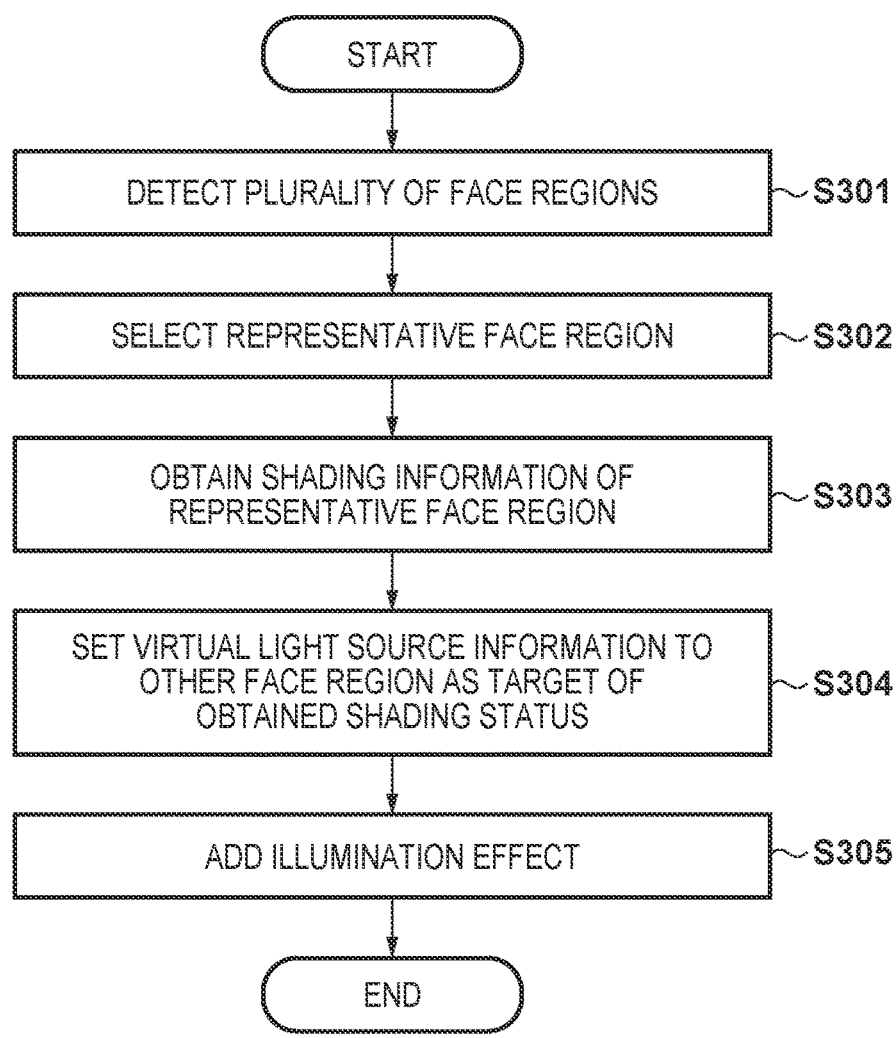

CASE WHERE THERE ARE A PLURALITY OF FACE REGIONS

EXAMPLE OF DIVIDING REPRESENTATIVE FACE INFORMATION BY BLOCK

EXAMPLE OF DIVIDING NON-REPRESENTATIVE FACE INFORMATION BY BLOCK

EXAMPLE OF ARRANGING VIRTUAL LIGHT SOURCE

EXAMPLE OF HIGH LUMINANCE AND
LOW LUMINANCE REGIONS OF
REPRESENTATIVE FACE REGION

EXAMPLE OF SETTING VIRTUAL LIGHT SOURCE
FOR REPRESENTATIVE FACE REGION

IMAGE PROCESSING APPARATUS AND METHOD FOR APPLYING A VIRTUAL LIGHT SOURCE TO AN IMAGE

BACKGROUND OF THE INVENTION

Field of the Invention

The present invention relates to an image processing apparatus, control method for the same and an image capturing apparatus.

Description of the Related Art

Conventionally, re-lighting processing for generating an image in accordance with image processing after capturing that appears as if it was captured under an illumination environment different to a capturing time is known. To generate an image that appears as if it was captured under a desired illumination environment by re-lighting processing, there is a necessity to appropriately set a position or intensity of a virtual light source for the re-lighting processing. Japanese Patent Laid-Open No. 2007-148537 discloses a technique for setting an intensity of a virtual light source in accordance with whether or not a face of a person is present, or in accordance with a position of a face of a person.

In the above-described conventional technique, although it is possible to set an appropriate intensity of a virtual light source in a case where only one subject is present, no consideration is given for processing in a case where a plurality of subjects are present. In other words, although it is advantageous to be able to individually adjust an illumination environment for a plurality of subjects, if a virtual light source is independently set for each subject, there are cases in which a way of setting shading becomes mutually inconsistent and a generated image becomes unnatural.

SUMMARY OF THE INVENTION

The present invention has been made in consideration of the aforementioned problems, and realizes a technique for reducing a sense of unnaturalness of shading between subjects in a case of applying a virtual light source to a plurality of subjects.

In order to solve the aforementioned problems, one aspect of the present invention provides an image processing apparatus, comprising: an obtainment unit configured to obtain an image; a setting unit configured to set, based on a shading status of a region of a first subject out of a plurality of subjects included in the image, a virtual light source for virtually emitting light on a region of a second subject in the image that is different to the first subject; and a generation unit configured to generate an image having a shading status such that light based on the set virtual light source is emitted onto the region of the second subject.

Another aspect of the present invention provides, an image capturing apparatus, comprising: an image capturing unit configured to capture an image; a setting unit configured to set, based on a shading status of a region of a first subject out of a plurality of subjects included in the image, a virtual light source for virtually emitting light on a region of a second subject in the image that is different to the first subject; and a generation unit configured to generate an image having a shading status such that light based on the set virtual light source is emitted onto the region of the second subject.

Still another aspect of the present invention provides, a control method of an image processing apparatus, comprising: obtaining an image; setting, based on a shading status of a region of a first subject out of a plurality of subjects included in the image, a virtual light source for virtually emitting light on a region of a second subject in the image that is different to the first subject; and generating an image having a shading status such that light based on the set virtual light source is emitted onto the region of the second subject.

According to the present invention, it becomes possible to reduce a sense of unnaturalness of shading between subjects in a case of applying a virtual light source to a plurality of subjects.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a flowchart illustrating a series of operations of re-lighting processing according to the first embodiment.

DESCRIPTION OF THE EMBODIMENTS (First Embodiment)

Exemplary embodiments of the present invention will be explained hereinafter in detail, with reference to the drawings. Note that, as an example of an image processing apparatus, explanation is given below of an example in which the present invention is applied to a digital camera that can perform re-lighting processing to a captured image. However, the present invention is not limited to a digital camera, and can also be applied to devices that can perform re-lighting processing to an input image. These devices may include, for example, a mobile telephone, a game device, a tablet terminal, a personal computer, a watch-type or glasses-type information terminal, a monitoring system, a medical device, and the like.

(Configuration of Digital Camera 100)

Figure 1:
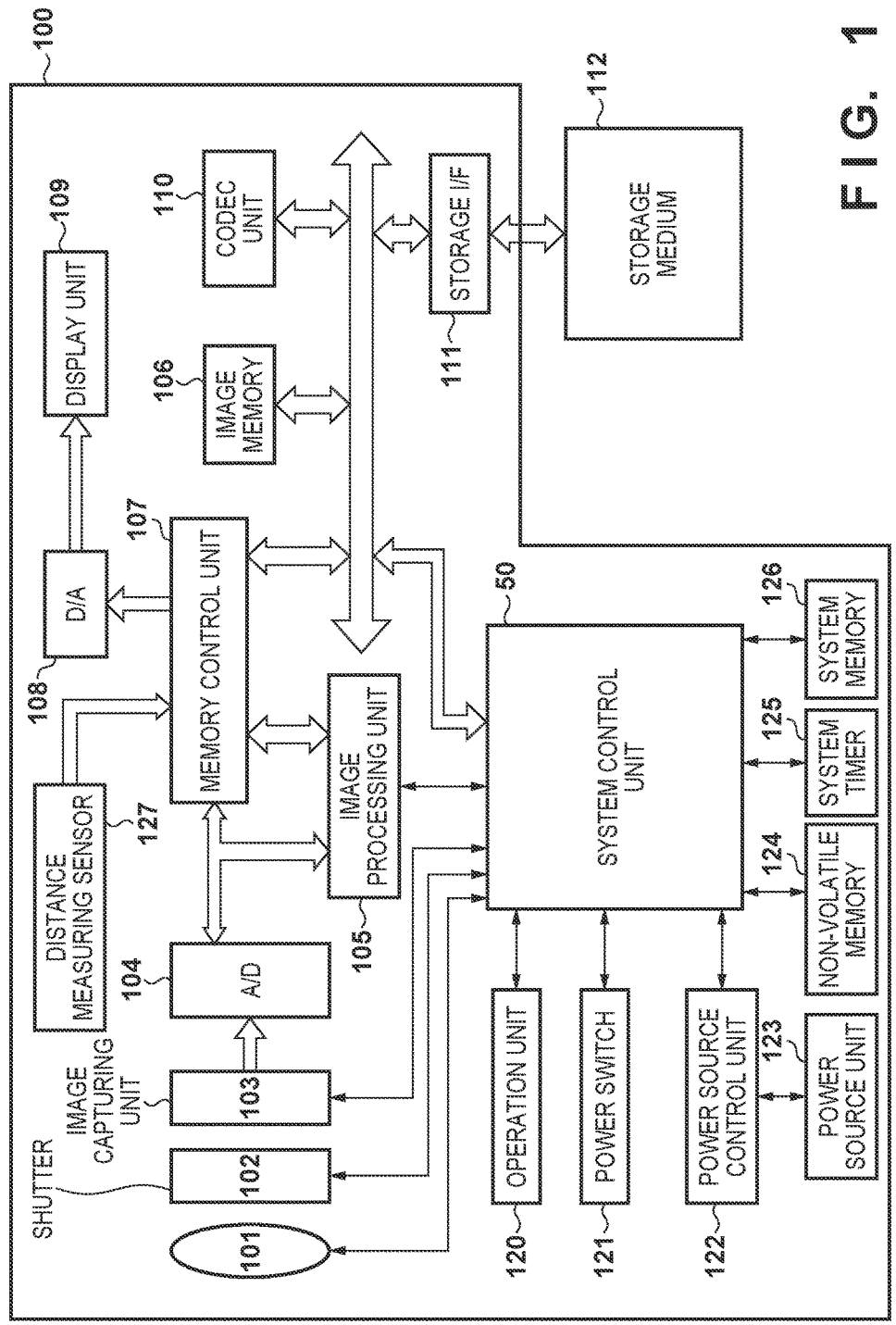
FIG. 1 is a block diagram illustrating a functional configuration example of a digital camera as an example of an image processing apparatus according to embodiments of the present invention.

FIG. 1 is a block diagram illustrating a functional configuration example of a digital camera 100 as an example of an image processing apparatus of the present embodiment. Note that, one or more of the functional blocks shown in FIG. 1 may be realized by hardware such as an ASIC, a programmable logic array (PLA), or the like, and may be realized by a programmable processor such as a CPU, an MPU, or the like, executing software. Also, these may be realized by a combination of software and hardware. Therefore, in the following description, even in cases when different functional blocks are recited as performers of actions, the same hardware can be realized as the performer.

An imaging optical system 101 includes a zoom lens and a focus lens, and causes an optical image from a subject to form in an image capturing element included in an image capturing unit 103. A shutter 102 is equipped with an aperture function, and causes an optical image of a subject to be exposed over a predetermined interval.

The image capturing unit 103 includes the image capturing element which has a configuration in which a plurality of pixels each having a photoelectric conversion element are arranged two-dimensionally. The image capturing element photoelectrically converts by each pixel a formed optical image, and outputs a pixel-unit analog image signal. The image capturing element for example includes a CCD (Charge-Coupled Device) image sensor, a CMOS (Complementary Metal Oxide Semiconductor) image sensor, or the like. The image capturing element for example has color filters of a primary color Bayer array, and in each pixel a color filter of any of R (red), G (green), or B (blue) is provided. The image capturing unit 103 outputs an image signal in an RGB format that is divided into these color components.

An A/D conversion unit 104 outputs image data by converting an analog image signal output from the image capturing unit 103 into a digital signal. An image processing unit 105 performs various image processing such as white balance processing, y processing, or color correction processing to the image data output from the A/D conversion unit 104.

An image memory 106 includes a volatile storage medium, and temporarily holds captured image data, image data read from a storage medium 112, or the like. A memory control unit 107 controls reading or writing of data with respect to the image memory 106. A D/A conversion unit 108 includes a conversion circuit or a module, for converting an input digital signal to an analog signal.

A display unit 109, includes a display device, such as a liquid crystal display, an organic EL display, or electronic paper, for example. The display unit 109 displays a captured or reproduced image, displays a live view image, and also, for example, displays a menu for operating the digital camera 100.

A codec unit 110 includes a computation circuit or a module, and encodes/decodes image data. A storage I/F 111 includes an interface with the storage medium 112, and transmits/receives data with respect to the storage medium 112.

The storage medium 112 is a large-capacity storage medium capable of random access, such as a memory card. The storage medium 112 can be easily mounted or detached with respect to the digital camera 100 by a user in accordance with a mount/discharge mechanism (not shown).

A system control unit 50 has, for example, a CPU (MPU), a memory or the like, and executes a program stored in a non-volatile memory 124 to control each block of the digital camera 100, and controls data transfer between blocks. In addition, the system control unit 50 controls each block of the digital camera 100 in accordance with an operation signal from an operation unit 120 that receives an operation from a user.

The operation unit 120 includes switch types for inputting various operations relating to capturing, such as a still image recording button, a moving image recording initiation, a button for instructing termination, or the like, for example. In addition, the operation unit 120 has a menu display button, a determination button, as well as a cursor keypad, a pointing device, a touch panel, or the like, and transmits an operation signal to the system control unit 50 when these keys or buttons are operated by a user. A power switch 121 includes a switch for operating ON/OFF of a power supply of the digital camera 100. The power switch 121 may be included in the operation unit 120.

A power source control unit 122 performs detection of whether or not a battery is attached, a type of the battery, a remaining capacity of the battery, and controls power supplied from a power source unit 123.

The non-volatile memory 124 is a storage medium such as a memory card for which electrically deleting/storing is possible, and for example includes an EEPROM or the like. The non-volatile memory 124 stores, for example, constants for operation, and a program for the CPU in the system control unit 50.

A system timer 125 measures an interval used in various control, or time of an embedded clock. A system memory 126 loads, for example, a program read from the non-volatile memory 124, variables, and constants for operation of the system control unit 50. A distance measuring sensor 127 measures a depth to a subject in each pixel of the image data at a capturing time, and outputs depth information to the system control unit 50 or the image processing unit 105.

(Basic Operations of the Digital Camera 100 at Capturing Time)

Next, with reference to FIG. 1, description is given of basic operations at a time of capturing by the digital camera 100 which has been described.

The image capturing unit 103 photoelectrically converts light incident via the imaging optical system 101 and the shutter 102, and outputs it to the A/D conversion unit 104 as an image signal. The A/D conversion unit 104 converts an analog image signal output from the image capturing unit 103 into a digital image signal, and outputs it to the image processing unit 105.

With respect to image data from the A/D conversion unit 104 or image data read from the memory control unit 107, the image processing unit 105 performs color conversion processing such as white balancing, Y processing, or the like, and outputs image data for any of, luminance/color difference signal Y, R-Y, B-Y, and Bayer RGB data. Image data output from the image processing unit 105 is written to the image memory 106 via the memory control unit 107. In addition, the image processing unit 105 performs predetermined computation processing with respect to input image data, and an obtained computation result is output to the system control unit 50. The system control unit 50 performs exposure control and focus control based on the computation result from the image processing unit 105. By this, it is possible to perform AF (auto-focus) processing of a TTL (through the lens) method, AE (automatic exposure) processing, or the like, for example. The image processing unit 105 further analyzes captured image data, estimates a light source at a time of capturing, and performs AWB (auto white balance) processing based on the estimated light source.

The image memory 106 stores image data for displaying on the display unit 109, such as image data output from the A/D conversion unit 104 or the image processing unit 105. In addition, the D/A conversion unit 108 converts data for image display stored in the image memory 106 into an analog signal, and supplies it to the display unit 109. The display unit 109 displays, on a display apparatus such as an LCD, in accordance with an analog signal from the D/A conversion unit 108. In addition, the codec unit 110 encodes, based on a specification such as MPEG for example, image data stored in the image memory 106, and encoded data is stored to the storage medium 112 via the storage I/F 111.

(Series of Operations for Re-lighting Processing)

Figure 2:
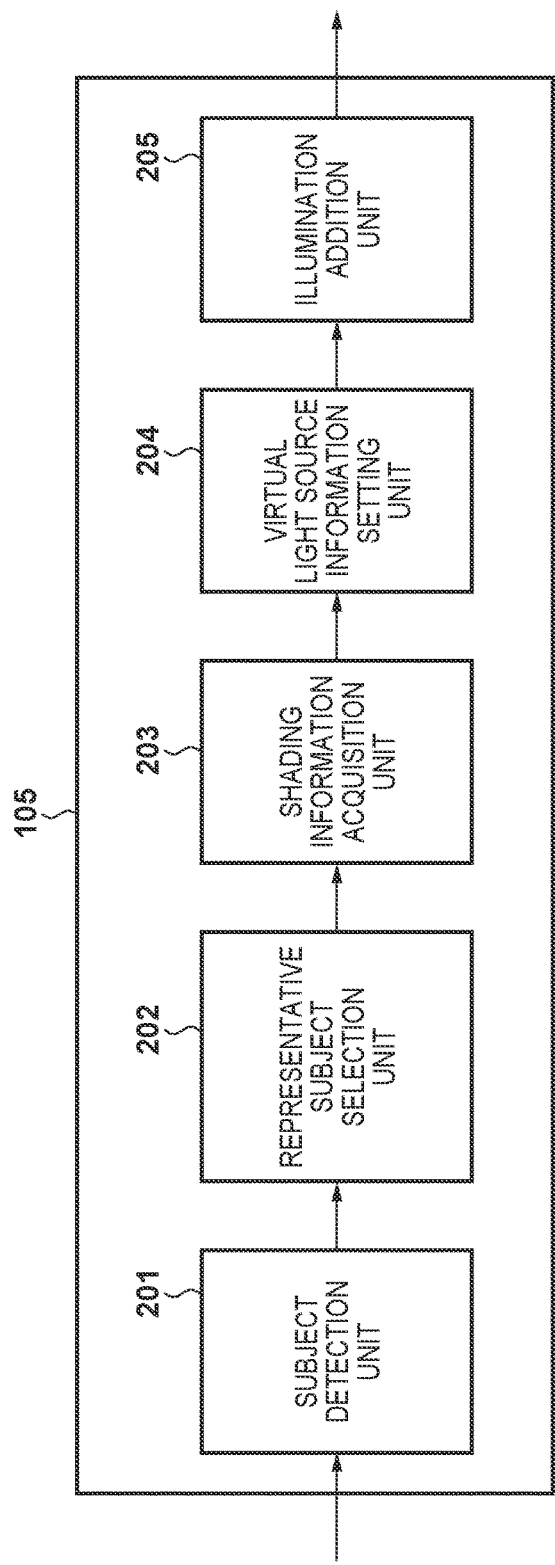
FIG. 2 is a view for illustrating a functional configuration example of an image processing unit according to a first embodiment.

Next, referring to FIG. 2 through FIG. 4D, description is given of a series of operations for re-lighting processing of the present embodiment. FIG. 2 illustrates a functional configuration example of the image processing unit 105 according to the present embodiment, FIG. 3 illustrates a flowchart for re-lighting processing of the present embodiment, and FIGS. 4A-4D illustrate details of processing for setting a position of a virtual light source. In addition, the series of operations for re-lighting processing is initiated in a case where, for example, image data, captured by the image capturing unit 103 in accordance with an image capturing instruction from a user with respect to the operation unit 120, is input to the image processing unit 105. In addition, this processing is realized by the system control unit 50 loading a program stored in the non-volatile memory 124 into a work area of the system memory 126, executing it, and controlling the image processing unit 105 (or each unit that configures the image processing unit 105).

Figure 4A:
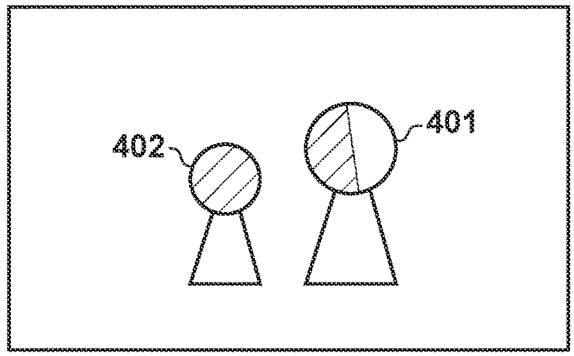
FIGS. 4A-4D are views for describing in detail processing for setting a position of a virtual light source, according to the first embodiment.

In step S301, a subject detection unit 201 detects a plurality of face regions from image data obtained by capturing. The processing for detecting a face region of the present embodiment can use a publicly known facial recognition technique, and it is possible to use a method for detecting a face region by detecting a predetermined organ such as eyes or a mouth, for example. By this processing, face regions 401 and 402 illustrated in FIG. 4A are detected, for example.

In step S302, a representative subject selection unit 202 selects one face region to becomes a representative (also simply called a representative region) from the plurality of face regions detected in step S301. More detailed processing is described later.

In step S303, a shading information acquisition unit 203 obtains shading information of the face region selected as the representative region in step S302. More detailed processing is described later.

In step S304, a virtual light source information setting unit 204 sets a parameter (virtual light source information) of a virtual light source for virtually irradiating light on a face region other than the representative region, based on the face region shading information obtained in step S303. Specifically, the virtual light source information setting unit 204 sets an intensity and a position of a virtual light source so that the shading status (a way of applying shading) of a face region other than the representative region approaches the shading status of the representative region. Further detailed processing is described later.

In step S305, an illumination addition unit 205 uses the virtual light source information set in step S304 to add an effect by virtually illuminating light on the face region other than the representative region. For adding of an illumination effect in the present embodiment, it is possible to use a publicly known re-lighting technique disclosed in Japanese Patent Laid-Open No. 2010-135996, for example. Upon generating and outputting an image in which the illumination effect has been added (an image having a shading status as if it was captured under an illumination environment different to that of a capturing time), the illumination addition unit 205 terminates processing, and the system control unit 50 terminates the series of operations.

Next, explanation is given in detail for each of processing for selecting a representative region in step S302, processing for obtaining shading information in step S303, and processing for setting virtual light source information in step S304.

In step S302, the representative subject selection unit 202 selects one face region to become a representative from the plurality of face regions detected in step S301. This is to add an illumination effect to a plurality of face regions, with reference to the shading of the representative region (which is, for example, a primary subject). If the shading status of a face region other than the representative region approaches the shading status of the representative region, finishing that reduces unnaturalness overall for the image after processing, even in the case of adding an illumination effect to each of the plurality of face regions, is achieved. As illustrated in FIG. 4A for example, the representative subject selection unit 202 selects the face region 401, for which an occupied area in the image is largest out of a plurality of face regions, as the representative region. Note that configuration may be taken to use, for example, a method of selecting a face region closest to the center of the image or a method of selecting a face region for which a way that shading is applied is preferable (for example, a distribution of luminance values or a direction of shading satisfy a predetermined condition), or use another method such as a combination of these.

Figure 4B:
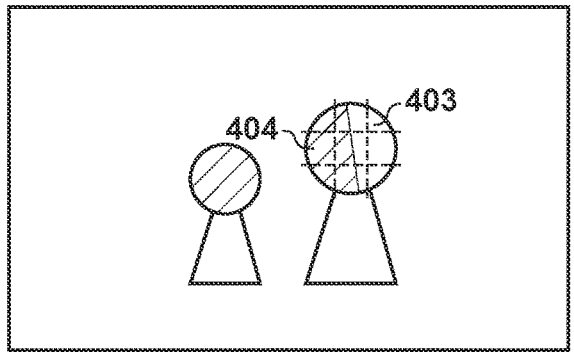

In step S303, the shading information acquisition unit 203 obtains shading information of the representative region selected in step S302. Specifically, the shading information acquisition unit 203 calculates a distribution form of shading of the representative region. For example, the representative region is divided into a plurality of blocks (for example, 3×3=9 blocks) as illustrated in FIG. 4B, and a luminance average value is calculated for each divided block. Next, the shading information acquisition unit 203 calculates shading information of the representative region based on the calculated luminance average values. For example, from the divided plurality of blocks, a luminance Dh of a block having a highest average luminance (a block 403 in FIG. 4B) and a luminance Dl of a block having a lowest average luminance (a block 404 in FIG. 4B) are calculated, and a group of Dh and Dl is set as the shading information of the representative region. In other words, the shading information of the present embodiment holds information relating to a direction of shading and an intensity distribution of luminance in the representative region.

Figure 4C:
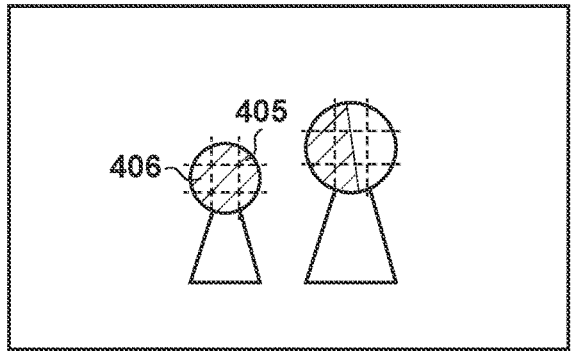

In step S304, the virtual light source information setting unit 204 sets information of a virtual light source. The information of the virtual light source includes an intensity and a position (direction) of the virtual light source, for example. The virtual light source information setting unit 204 sets virtual light source information at a time of adding an illumination effect to a face region other than a representative region so that the shading status of the face region other than the representative region approaches the shading status of the representative region. Specifically, the virtual light source information setting unit 204 uses a division method (3×3) similar to that of step S303 to divide the face region other than the representative region into a plurality of blocks as illustrated in FIG. 4C, and calculates a luminance average value for each divided block. Next, out of blocks divided in the face region other than the representative region, a luminance average value Dh' of a block (a block 405) having a positional relationship (corresponding positional relationship) that is the same as that of the position of the block having the highest luminance average value in the representative region (for example, the block 403) is obtained. A difference between the luminance average value Dh of the block 403 and the luminance average value Dh' of the block 405 is obtained in accordance with Equation 1.

$$DH=Dh-Dh' \quad (1)$$

Similarly, the virtual light source information setting unit 204 obtains, from divided blocks of the face region other than the representative region, a luminance average value Dl' of a block (a block 406) at a positional relationship that is the same as that of a block (the block 404) having a lowest luminance average value in the representative region selected in step S303. A difference DL between the luminance average value Dl of the block 404 and the luminance average value Dl' of the block 406 is obtained in accordance with Equation 2.

$$DL=Dl-Dl' \quad (2)$$

In other words, by obtaining the difference DH and the difference DL, it is possible to obtain a difference between a direction of shading and an intensity distribution of luminance in the representative region and a direction of shading and an intensity distribution of luminance in a region other than the representative region.

Figure 4D:
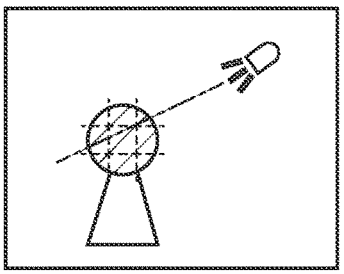

Next, the virtual light source information setting unit 204, after comparing the size of the calculated difference DH and difference DL, sets the position (direction) of a virtual light source so that the shading status of the face region other than the representative region approaches the shading status of the representative region. If the high luminance value difference DH is greater than or equal to the low luminance value difference DL, the virtual light source information setting unit 204 arranges the virtual light source on a straight line connecting the center of the block 405 and the center of the block 406 so that the light of the virtual light source is irradiated on the block 405 before the block 406. In other words, the virtual light source is arranged so that the virtual light source, the center of the block 405, and the center of the block 406 are lined up in this order on the straight line (FIG. 4D). Conversely, if the high luminance value difference DH is less than the low luminance value difference DL, the virtual light source is arranged on a straight line connecting the center of the block 405 and the center of the block 406 so that the light of the virtual light source is irradiated on the block 406 before the block 405. In other words, the virtual light source is arranged so that the virtual light source, the center of the block 405, and the center of the block 406 are lined up in this order.

In addition, the virtual light source information setting unit 204 calculates an intensity S1 of the virtual light source in accordance with Equation 3.

$$S1=|DH-DL| \quad (3)$$

Upon arranging the virtual light source, the virtual light source information setting unit 204 advances the processing to step S305 described above, and when the processing of step S305 completes the system control unit 50 terminates this series of operations.

Note that, in the present embodiment, although description was given regarding an example in which the position (direction) of the virtual light source is determined in a two-dimensional space, configuration may be taken to determine the position (direction) of the virtual light source in a three-dimensional space by further considering depth information. In such a case, if distance information corresponding to each pixel of the image output from the distance measuring sensor 127 is used as depth information, it is possible to apply the embodiment described above to a three-dimensional space.

In addition, in the present embodiment, even in a case where three or more subject regions (face regions) are present in an angle of view, it is possible to perform re-lighting processing by selecting one representative region similarly to in the processing described above, and taken shading information of the representative region as a reference. In the present embodiment, although explanation was given that took a face region as an example, it is possible to apply the method described above even in a case in which a subject region is an entire person or a predetermined object.

Note that, in the present embodiment, description was given by taking a case in which an illumination effect is not provided to a representative region as an example. However, configuration may be taken to cause the shading status of the representative region to be changed in advance by a method different to processing by the virtual light source described above. In such a case, configuration may be taken to set virtual light source information with respect to a face region other than the representative region and add an illumination effect, with reference to shading information of the representative region after the shading status has been changed.

Note that, in the present embodiment, although description was given regarding re-lighting processing in which one subject (region) that is to be a representative is selected from a plurality of subjects, configuration may be taken to perform re-lighting processing in which a plurality of subjects are divided into a plurality of groups, and, for each divided group, a subject to be a representative is selected. For example, it is possible to estimate that a way of applying ambient light is different if a distance between a plurality of subjects is a greater than or equal to a predetermined distance. In such a case, configuration may be taken to firstly divide the subjects into groups, select a subject to be a representative in each group, and then perform the re-lighting processing described above. In this way, it is possible to further reduce unnaturalness of an image after re-lighting in a case where a way of applying shading difference between groups for which the way ambient light is applied is different.

Note that, in the present embodiment, although an intensity and a position (direction) of a virtual light source were used as virtual light source information, configuration may be taken to further consider a diffusion characteristic in a face region. In other words, configuration may be taken to appropriately set a diffusion characteristic of a face region other than a representative region to approach a shading status of the representative region. For example, configuration may be taken to set the diffusion characteristic to be low in a case of desiring to further emphasize shading due to the virtual light source, and to set the diffusion characteristic to be high in a case of wanting to lessen shading.

As described above, in the present embodiment re-lighting processing of an image is performed by, if there are a plurality of face regions, based on a shading status of a representative region, setting a virtual light source for causing the shading status of a face region other than the representative region to change so as to approach the shading status of the representative region. In this way, in a case of applying the re-lighting processing to an image that includes a plurality of subjects, it is possible to more appropriately set a shading status of the plurality of subjects. In other words, it becomes possible to reduce a sense of unnaturalness of shading between subjects in a case of applying a virtual light source to a plurality of subjects.

(Second Embodiment)

Next, explanation is given for a second embodiment. In the first embodiment, description was given regarding re-lighting processing for setting a virtual light source with respect to a face region other than a representative region, with reference to a shading status of the representative region. In the second embodiment, a virtual light source is set with respect to a representative region, an illumination effect is also added with respect to the representative region, and information of the virtual light source is used to add an illumination effect to another face region other than the representative region. In the present embodiment, the configuration of the digital camera 100 may be the same as in the case of the first embodiment, and only processing for step S601 through step S605 in the re-lighting processing is different. Accordingly, the same reference numeral is added regarding the same configuration or the same step, a duplicate description is omitted, and description is predominantly given regarding points of difference.

(Series of Operations for Re-lighting Processing)

Figure 5:
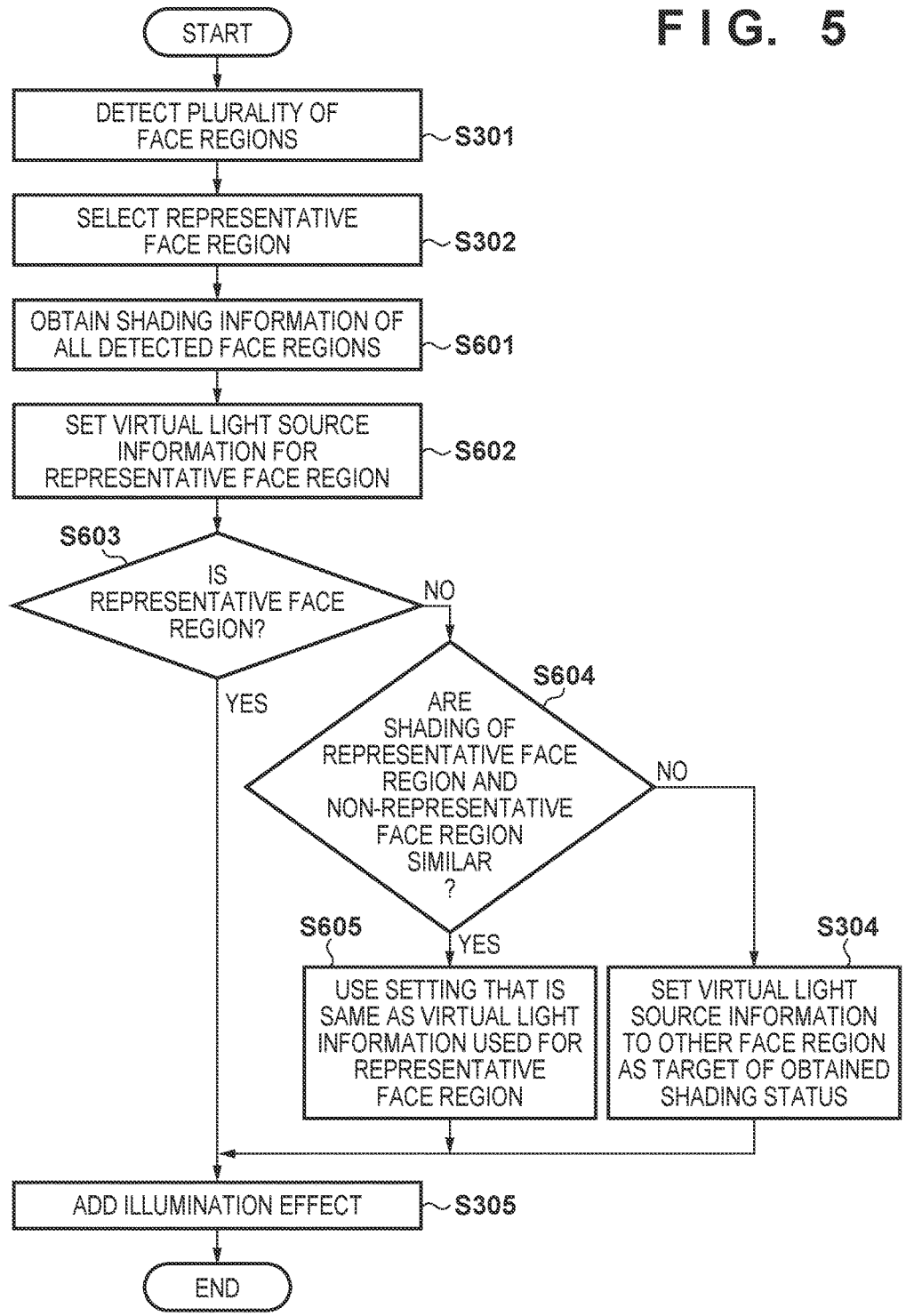
FIG. 5 is a flowchart illustrating a series of operations of re-lighting processing according to the second embodiment.

With reference to FIG. 5, description is given regarding a series of operations of re-lighting processing according to the present embodiment. Note that, the series of operations for the re-lighting processing according to the present embodiment is, similarly to in the first embodiment, initiated in a case when image data captured by the image capturing unit 103 is input to the image processing unit 105 in accordance with an image capturing instruction from a user with respect to the operation unit 120, for example. In addition, this processing is realized by the system control unit 50 loading a program stored in the non-volatile memory 124 into a work area of the system memory 126, executing it, and controlling the image processing unit 105 (or each unit that configures the image processing unit 105).

Firstly, the image processing unit 105, in accordance with an instruction by the system control unit 50, selects a face region to be a representative (in other words, a representative region) in accordance with the processing in step S301 and step S302.

In step S601, the shading information acquisition unit 203 obtains shading information with respect to each of all the face regions detected in step S301. The shading information acquisition unit 203 uses the method of obtaining shading information described above in step S303 to obtain shading information of each region. In step S602, the virtual light source information setting unit 204 sets an intensity and position of a virtual light source with respect to the representative region selected in step S302. More detailed processing is described later.

In step S603, the virtual light source information setting unit 204 determines, with respect to all face regions detected in step S301, whether a processing target region is the representative region. If a processing target region is the representative region, the virtual light source information setting unit 204 advances the processing to step S305, and if not the representative region advances the processing to step S604.

In step S604, the virtual light source information setting unit 204 determines whether shading is similar between the representative region and each face region other than the representative region, based on the shading information obtained in step S601. Description is given later regarding more detailed processing, but if it is determined that the shading is similar the processing advances to step S605, and if it is determined that the shading is not similar the processing advances to step S304.

In step S605, the virtual light source information setting unit 204 sets the same information as the virtual light source information used in the representative region as virtual light source information for adding an illumination effect to the face region other than the representative region.

In step S304, the virtual light source information setting unit 204 sets, as virtual light source information in a case of adding an illumination effect to the face region other than the representative region, the intensity and position of the virtual light source so that the shading status of the representative region is approached, based on the shading information of the representative region. In step S305, the illumination addition unit 205 adds the illumination effect to all face regions detected in step S601, based on the virtual light source information set by the processing up until step S304, and thereafter this series of operations terminates.

Next, explanation is given in more detail regarding processing for setting virtual light source information to the representative region in step S602, and processing for determining whether shading is similar between a representative region and a face region other than the representative in step S604.

In step S602, the virtual light source information setting unit 204 sets the virtual light source information with respect to the representative region. In this step, the virtual light source information setting unit 204 sets the virtual light source information so that a way of adding the shading of the representative region becomes as desired. If it determined by a determination described later that shading of the representative region is not applied much, the virtual light source information setting unit 204 sets virtual light source information so as to increase the shading, and conversely if it is determined that shading is applied too much, the virtual light source information is set so as to lessen the shading.

Figure 6A:
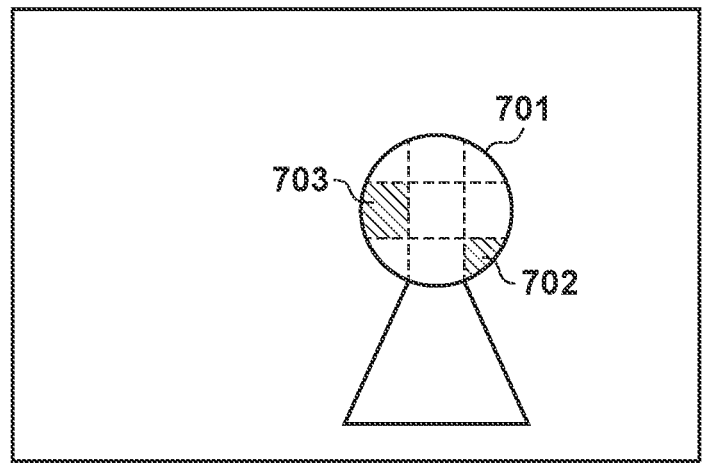
FIGS. 6A-6B are views for describing in detail processing for setting a position of a virtual light source, according to the second embodiment.
Figure 6B:
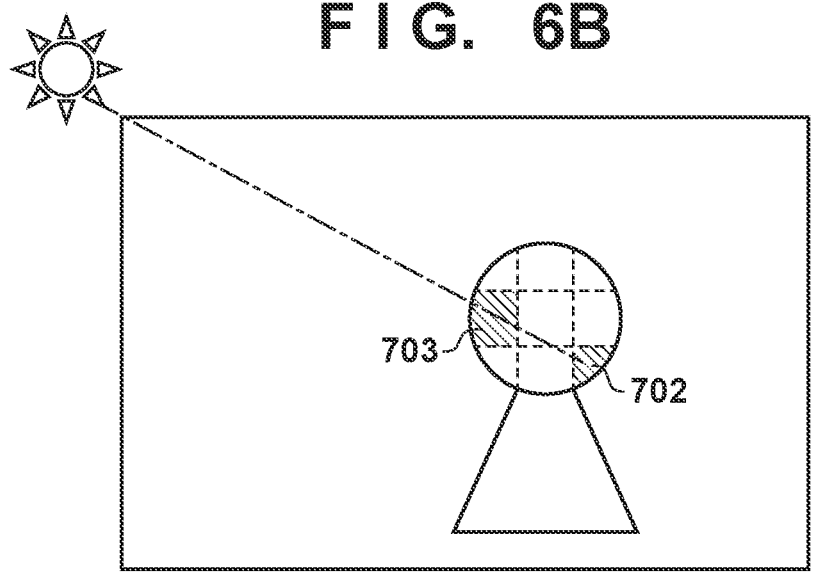

With reference to FIGS. 6A through 6B, explanation is given regarding an example in which the virtual light source information setting unit 204 sets shading information. As illustrated in FIG. 6A, a face region to be a representative (a representative region 701) is detected, and a position of a virtual light source with respect to this state is obtained. As described with reference to FIGS. 4A-4D, the virtual light source information setting unit 204 divides the representative region 701 into a plurality of regions, and calculates a luminance average value for each divided region. A difference D2 between a luminance average value Yh of a region having a highest luminance average value (reference numeral 703 of FIG. 6A) and a luminance average value Yl of a region having a lowest luminance average value (reference numeral 702 of FIG. 6A) is calculated in accordance with Equation 4.

$$D2=Yh-Yl \qquad (4)$$

The virtual light source information setting unit 204 compares the calculated difference D2 and a predetermined threshold T1, and determines whether shading is applied too much in the representative region. In other words, if the difference D2 is lower than the threshold T1, the virtual light source information setting unit 204 determines that the shading is has not been applied very much, and arranges the virtual light source so as to increase the shading. For example, the virtual light source information setting unit 204 arranges the virtual light source on a straight line connecting the center of the high luminance area 703 and the center of the low luminance area 702 so that the virtual light source, the center of the high luminance area 703, and the center of the low luminance area 702 line up in this order (FIG. 6B).

However, if the difference D2 is greater than or equal to the threshold T1, the virtual light source information setting unit 204 determines that the shading is applied too much, and arranges the virtual light source so as to lessen the shading. Specifically, the virtual light source is arranged on a straight line connecting the center of the high luminance area 703 and the center of the low luminance area 702 so that the virtual light source, the center of the low luminance area 702, and the center of the high luminance area 703 line up in this order.

In addition, the virtual light source information setting unit 204 calculates an intensity S2 of the virtual light source in accordance with Equation 5.

$$S2 = k1 \times (\text{Max}Y - Yh) \qquad (5)$$

Here, let MaxY be a maximum value in a range that can be taken for a luminance value, and let k1 be a predetermined coefficient that is positive number less than or equal to 1. Configuration may be taken such that k1 is predetermined in accordance with a test result or the like such that a luminance value is not saturated due to illumination addition processing.

In step S604, the virtual light source information setting unit 204 determines whether the shading of the representative region is similar to the shading of a face region other than the representative region. In the present embodiment described above, if it is determined that the shading is similar, virtual light source information that is the same as the virtual light source information for the representative region is set for the face region other than the representative region in step S605. In this way, processing for re-setting the virtual light source information with respect to a face region for which shading is similar decreases, and it is possible to reduce an amount of calculation. In addition, if the shading status of two face regions is similar, even in the virtual light source information for the representative region is used, because the two regions will have similar shading statuses, the image will not become unnatural after adding an illumination effect.

More specifically, for example, it is assumed that shading information (Dh, Dl) of a representative region and shading information (Dh", Dl") of a face region other than a representative is obtained in step S601. In such a case, the virtual light source information setting unit 204 determines whether the position of a block for which Dh was calculated out of blocks in the representative region and the position of a block for which Dh" was calculated out of blocks in the face region other than the representative region are in the same positional relationship (corresponding positional relationships). In addition, it is determined whether the block in the representative region for which Dl was calculated and the block in the face region other than the representative region for which Dl" was calculated are at the same positional relationship. It is determined whether a difference between the calculated Dh and Dh" is less than a predetermined threshold T2, and whether a difference between the calculated Dl and Dl" is less than a predetermined threshold T3. In the case that these conditions are all satisfied, the virtual light source information setting unit 204 determines that the shading of the representative region is similar to the shading of the face region other than the representative region, and advances processing to step S605. Meanwhile, if the above-described conditions are not satisfied, it determines that the shading of the representative region is not similar to the shading of the face region other than the representative, and advances the processing to step S304.

Note that, in the present embodiment, if it is determined that the shading of a representative region is similar to the shading of a face region other than the representative region, configuration is taken so as to add an illumination effect for setting a virtual light source that is the same as for the representative region, with respect to the face region other than the representative region. However, in a scene such as a night scene or a shaded area, if the shading of a plurality of face regions are estimated to be similar, configuration may be taken to not perform the determination processing of step S604 with respect to this plurality of face regions, but to add an illumination effect by applying virtual light source information with respect to the representative region. In this way, it is possible to reduce a burden of the re-lighting processing with respect to a particular plurality of face regions under certain conditions such as a night scene.

As described above, in the present embodiment, a virtual light source is set to a representative region, and, if shading of a face region other than the representative region is similar to shading of the representative region, virtual light source information with respect to the representative region is re-used and applied to the face region other than the representative region. In this way, if a virtual light source is applied to a plurality of subjects, it is possible to reduce a sense of unnaturalness of shading between subjects, and it is possible to further reduce a processing burden.

Note that, in the two embodiments described above, although description was given of an example in which an illumination effect is added to an image by the re-lighting processing, other processing after capturing for generating an image of a shading status such as if it were captured in an illumination environment different to that of a capturing time is included in the re-lighting processing. For example, this may be processing for causing a size of a shaded portion to change or for causing the strength of the shading to change, in order to cause a shading status of a face region in an image to change.

In addition, in the two embodiments described above, although description was given of an example of performing re-lighting processing based on shading information of a face region of a subject, configuration may be taken to not use a face region if there is shading information of a subject. For example, in the case of a configuration that can distinguish a region (a person region) including a body of a person and not just a face region of a person, configuration may be taken to perform the re-lighting processing based on the shading information of the person region. Alternatively in the case in which an object where a face region is not present, such as a car, is a subject, configuration may be taken to perform the re-lighting processing based on shading information of the object.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-001293, filed Jan. 6, 2016, which is hereby incorporated by reference herein in its entirety.

What is claimed is:

1. An image processing apparatus, comprising:
   a processor; and
   a memory coupled to the processor, the memory storing instructions that, when executed by the processor, cause the image processing apparatus to:
   obtain an image;
   select a representative subject from the image, the image including a plurality of subjects including at least a first subject and a second subject;
   set, based on a shading status of a region of the first subject which is the representative subject, a virtual light source for virtually emitting light on a region of the second subject in the image that is different to the first subject; and
   generate an image having a shading status such that light based on the set virtual light source is emitted onto the region of the second subject.

2. The apparatus according to claim 1, wherein the memory further stores instructions that, when executed by the processor, cause the image processing apparatus to set the virtual light source such that the shading status of the region of the second subject approaches the shading status of the region of the first subject.

3. The apparatus according to claim 2, wherein the memory further stores instructions that, when executed by the processor, cause the image processing apparatus to set the virtual light source so as to make differences between a direction of shading and an intensity distribution of luminance in the region of the second subject and a direction of shading and an intensity distribution of luminance in the region of the first subject be small.

4. The apparatus according to claim 2, wherein the memory further stores instructions that, when executed by the processor, cause the image processing apparatus to set the virtual light source such that a distribution form of a high luminance region and a low luminance region in the region of the second subject approaches a distribution form of a high luminance region and a low luminance region in the region of the first subject.

5. The apparatus according to claim 4, wherein the memory further stores instructions that, when executed by the processor, cause the image processing apparatus to set a position of the virtual light source so that the high luminance region in the region of the second subject corresponding to the position of the high luminance region in the region of the first subject, the low luminance region in the region of the second subject corresponding to the position of the low luminance region in the region of the first subject, and the position of the virtual light source line up on a straight line.

6. The apparatus according to claim 5, wherein the memory further stores instructions that, when executed by the processor, cause the image processing apparatus to set the position of the virtual light source in accordance with which of a difference between the high luminance region in the region of the first subject and the high luminance region in the region of the second subject and a difference between the low luminance region in the region of the first subject and the low luminance region in the region of the second subject is larger.

7. The apparatus according to claim 1, wherein the first subject is a subject occupying a largest area in the image, or a subject closest to the center of the image.

8. The apparatus according to claim 1, wherein the memory further stores instructions that, when executed by the processor, cause the image processing apparatus to divide the plurality of subjects into a plurality of groups, and determines the first subject and the second subject for each group, and
   for each group, based on a shading status of a region of a first subject in the group, set a virtual light source for virtually emitting light onto a region of a second subject in the same group.

9. The apparatus according to claim 1, wherein the memory further stores instructions that, when executed by the processor, cause the image processing apparatus to:
   determine in advance a virtual light source for emitting a virtual light with respect to the region of the first subject;
   set characteristics of the virtual light source with respect to the region of the first subject to the virtual light source with respect to the region of the second subject if a shading status of the region of the second subject and the shading status of the region of the first subject are similar based on a predetermined reference; and
   set the virtual light source so that the shading status of the region of the second subject approaches the shading status of the region of the first subject if the shading status of the region of the second subject and the shading status of the region of the first subject are not similar based on the predetermined reference.

10. An image capturing apparatus, comprising:
    an image capturing unit configured to capture an image;
    a processor; and
    a memory coupled to the processor, the memory storing instructions that, when executed by the processor, cause the image processing apparatus to:
    select a representative subject from the image, the image including a plurality of subjects including at least a first subject and a second subject
    set, based on a shading status of a region of the first subject which is the representative subject, a virtual light source for virtually emitting light on a region of the second subject in the image that is different to the first subject; and
    generate an image having a shading status such that light based on the set virtual light source is emitted onto the region of the second subject.

11. A control method of an image processing apparatus, comprising:
- obtaining an image;
- selecting a representative subject from the image, the image including a plurality of subjects including at least a first subject and a second subject;
- setting, based on a shading status of a region of the first subject which is the representative subject, a virtual light source for virtually emitting light on a region of a second subject in the image that is different to the first subject; and
- generating an image having a shading status such that light based on the set virtual light source is emitted onto the region of the second subject.

* * * * *